(12) United States Patent
Sankrithi et al.

(10) Patent No.: US 11,208,213 B2
(45) Date of Patent: Dec. 28, 2021

(54) INTEGRATED AIRCRAFT FUSELAGE AND LOAD-BEARING STRUCTURAL BASE FOR AIRCRAFT SEATS

(71) Applicant: The Boeing Company, Chicago, IL (US)

(72) Inventors: Mithra M. K. V. Sankrithi, Seattle, WA (US); Max Urban Kismarton, Seattle, WA (US); James A. Fullerton, Bothell, WA (US); Gary Lee Senechal, Lake Stevens, WA (US); Sergey D. Barmichev, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 620 days.

(21) Appl. No.: 15/473,758

(22) Filed: Mar. 30, 2017

(65) Prior Publication Data

US 2018/0281971 A1 Oct. 4, 2018

(51) Int. Cl.
 *B64D 11/06* (2006.01)
 *B64C 1/18* (2006.01)

(52) U.S. Cl.
 CPC ............ *B64D 11/0648* (2014.12); *B64C 1/18* (2013.01); *B64D 11/0696* (2013.01); *Y02T 50/40* (2013.01)

(58) Field of Classification Search
 CPC ...... B64D 1/18; B64D 11/0696; B64D 11/06; Y02T 50/46; B61D 33/0021; E02F 9/16
 See application file for complete search history.

(56) References Cited

U.S. PATENT DOCUMENTS

| 2,933,127 | A | * | 4/1960 | Brewster | ............... B64D 11/064 297/216.2 |
| 3,785,600 | A | * | 1/1974 | Padovano | ............... B64D 11/06 248/188.1 |
| 6,766,985 | B2 | * | 7/2004 | Dussac | ................... B64C 1/066 244/117 R |
| 7,621,482 | B2 | | 11/2009 | Sankrithi et al. | |
| 7,717,372 | B2 | | 5/2010 | Sankrithi et al. | |

(Continued)

FOREIGN PATENT DOCUMENTS

| EP | 2 759 474 | 7/2014 |
| EP | 3 235 680 | 10/2017 |

OTHER PUBLICATIONS

Extended European Search Report prepared by the European Patent Office in application No. EP 18 164 195.2 dated Sep. 18, 2018.

*Primary Examiner* — Medhat Badawi
*Assistant Examiner* — Vicente Rodriguez
(74) *Attorney, Agent, or Firm* — McDonnell Boehnen Hulbert & Berghoff LLP

(57) ABSTRACT

A fuselage is described that includes a plurality of frames and a plurality of seat rows spaced apart according to a seat pitch. Each frame includes a lateral floor beam, and each seat row of the plurality of seat rows includes a load-bearing structural base with a plurality of legs attached to a proximal lateral floor beam and a distal lateral floor beam. Each seat row also includes a seat or bank of seats attached to the load-bearing structural base, where the seat or bank of seats includes at least one seat bottom and at least one seat back. Further, each seat row includes an interface between (i) the load-bearing structural base and (ii) the seat or bank of seats to allow for attachment and detachment of the seat or bank of seats relative to the load-bearing structural base.

20 Claims, 11 Drawing Sheets

(56) References Cited

U.S. PATENT DOCUMENTS

| | | | |
|---|---|---|---|
| 8,336,820 B2 * | 12/2012 | Osorio | B64C 1/18 |
| | | | 244/118.1 |
| 8,366,041 B2 | 2/2013 | Ricaud et al. | |
| 8,544,796 B2 | 10/2013 | Pozzi et al. | |
| 8,550,564 B1 * | 10/2013 | Kismarton | B64D 11/06 |
| | | | 297/216.1 |
| 8,561,946 B2 | 10/2013 | Barmichev et al. | |
| 8,590,126 B2 * | 11/2013 | Kismarton | A47C 5/00 |
| | | | 244/122 R |
| 2005/0211833 A1 | 9/2005 | Franz et al. | |
| 2007/0080258 A1 | 4/2007 | Baatz et al. | |
| 2011/0108666 A1 * | 5/2011 | Pozzi | B64D 11/062 |
| | | | 244/118.6 |
| 2011/0148167 A1 * | 6/2011 | Westerink | B64D 11/06 |
| | | | 297/354.12 |
| 2011/0233339 A1 * | 9/2011 | Plant | B64D 11/0696 |
| | | | 244/131 |
| 2012/0256466 A1 * | 10/2012 | Lievestro | A47C 27/15 |
| | | | 297/452.18 |
| 2016/0297533 A1 * | 10/2016 | Le | B64D 11/0647 |

\* cited by examiner

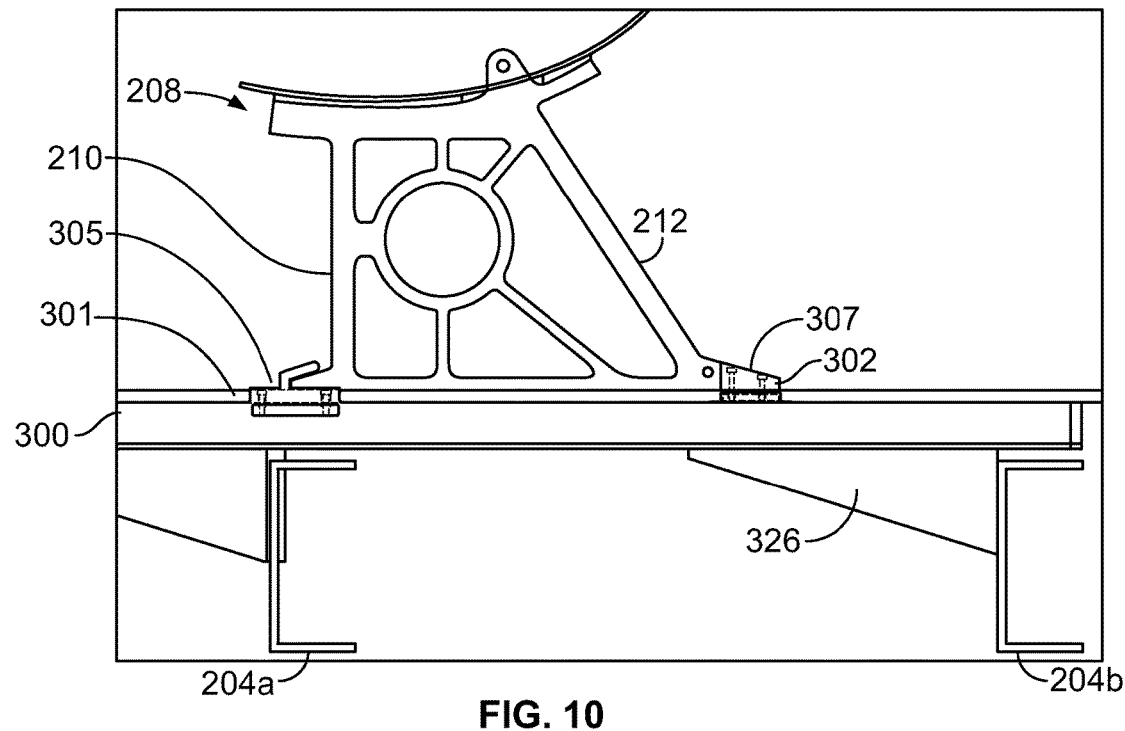
FIG. 10
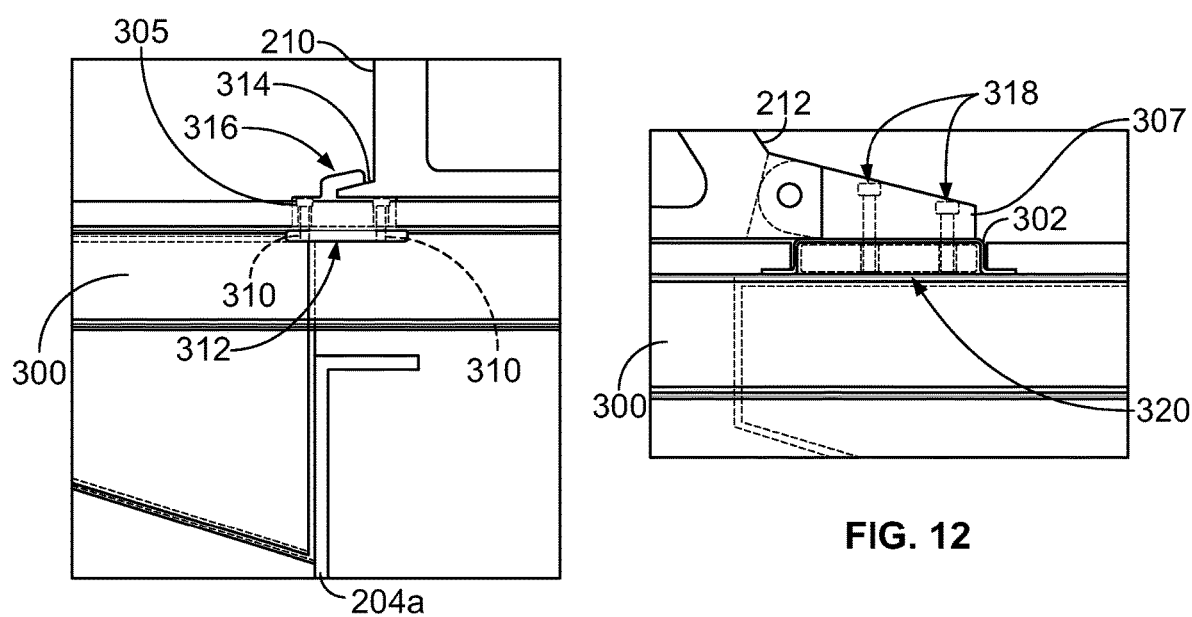
FIG. 11
FIG. 12

INTEGRATED AIRCRAFT FUSELAGE AND LOAD-BEARING STRUCTURAL BASE FOR AIRCRAFT SEATS

FIELD

The present disclosure generally relates to an aircraft, and more particularly to, methods and systems for attaching aircraft passenger seats to lateral floor beams of a frame of an aircraft fuselage.

BACKGROUND

Aircraft passenger seats are typically attached to a floor of an aircraft cabin through seat tracks in the floor. In particular, legs of the seats are attached to the seat tracks with fittings that can be attached to the seat tracks at various longitudinal locations along the seat track. In an example, the various longitudinal locations at which the fittings can be attached to the seat track are spaced apart by approximately one inch. Seat tracks are integrated into the cabin floor structure and extend longitudinally through the aircraft cabin. Floor surface panels are installed around the seat tracks so that the seat tracks are exposed. The floor surface panels and the exposed seat tracks are typically flush or substantially flush with one another.

FIG. 1 illustrates an example typical bank of seats attached to a floor of an aircraft cabin through seat tracks. In particular, FIG. 1 illustrates a seat row 100 having a bank of seats 101. The bank of seats 101 includes a plurality of legs 102-105. Legs 102, 103 are attached to floor 106 through seat track 108, and legs 104, 105 are attached to floor 106 through seat track 110. Floor 106 further includes floor surface panels 112-114 installed around and between the seat tracks 108, 110. Floor surface panels 112-114 and seat tracks 108, 110 are supported by underlying floor beams (not shown) that extend laterally between frames (not shown) of the aircraft.

FIG. 2 is an example perspective view of seat track 108 of FIG. 1. Seat track 108 includes a base 119 and a seat-leg engagement section 120 supported by the base 119. The seat-leg engagement section 120 includes a series of holes 122 to receive fittings to attach the seat legs 102, 103 to seat-leg engagement section 120. In a common example, the holes 122 are spaced apart approximately one inch from one another but other spacing is possible as well. By having holes 122 placed approximately every inch, the legs 102, 103 may be selectively positioned at any desired location along the seat track 108. This allows the aircraft manufacturer to control the pitch of the seat rows in the aircraft cabin.

Seat track 108 also includes upper surface 124 extending from seat-leg engagement section 120 to support floor surface panel 112 and upper surface 126 extending from seat-leg engagement section 120 to support floor surface panel 113. In an example, the floor surface panels 112, 113 are mounted to the upper surfaces by suitable fasteners, such as nuts and bolts. When floor surface panels 112, 113 are mounted to upper surfaces 124, 126, seat-leg engagement section 120 is exposed and the floor surface panels 112, 113 are flush or substantially flush with the top of seat-leg engagement section 120. When the seat rows are installed in the aircraft, the seat tracks 108, 110 are covered with a cover 130 (see FIG. 1), so that the holes 122 that are not used to receive fittings to attach the legs are hidden from view.

In certain aircraft designs, the fuselage is formed from frames separated from one another by a frame pitch. The frame pitch may vary depending on various design considerations, such as the material of the frames. Historically, frames of the fuselage have been formed with aluminum, and aluminum fuselages typically have a frame pitch of approximately 22 inches. However, with the advent of fuselages formed with composite materials, frame pitch may be increased and selected to be in the range of approximately 28 to 36 inches. This larger frame pitch has allowed for the design of reduced-perimeter aircraft in which the seat pitch is indexed to the frame pitch such that seats are located between adjacent frames. By locating seats between adjacent frames, seats can have additional width by utilizing space between frames along the inner mold line of the fuselage. This permits a reduced-perimeter aircraft fuselage (compared to aluminum fuselages having a frame pitch of approximately 22 inches) that maintains passenger comfort metrics (e.g., seat width). For example, the outboard arm rest may encroach into the inter-frame space, which allows for a reduced-perimeter aircraft fuselage that maintains passenger comfort metrics. Seat tracks are typically used to install aircraft seats regardless of the fuselage frame pitch.

The current methods of installing aircraft seats by attaching the seats to the floor through seat tracks, however, have numerous drawbacks. One example drawback is that seat tracks typically add substantial weight to the aircraft. For instance, in large commercial aircraft, seat tracks typically add 2,000 to 3,000 (or more) pounds to the aircraft. Another example drawback is that seat tracks are difficult and expensive to manufacture. Yet another drawback is that, in situations where the seat pitch is indexed to the frame pitch, the benefit of being able to selectively position seats at any desired location along the seat tracks is reduced. In particular, while seat tracks allow for selectively positioning seats at any desired location along the seat tracks so as to control the seat pitch, in situations where the seat pitch is indexed to the frame pitch, the seats will be positioned at a particular location relative to the frame. The seat will in turn be positioned at a particular location along the longitudinally extending seat track. This eliminates the benefit of being able to selectively position seats at any desired location along the seat tracks but maintains the drawbacks of the weight and cost of the seat tracks. It would thus be desirable to attach seats to a floor of an aircraft cabin without use of seat tracks, particularly when the seat pitch is indexed to the frame pitch.

Further, in the current method of installing aircraft seats, seat installation and the associated certification process are time consuming and expensive. Similarly, refurbishing or upgrading aircraft seats attached to seat tracks and the associated recertification process are also time consuming and expensive.

Still further, in the current method of installing aircraft seats, the airline manufacturer typically manufactures the fuselage and seat tracks, while the seat supplier typically manufacturers the fittings and the seats attached to the seat tracks. Since aircraft seats are subject to numerous certification requirements (e.g., requirements for reacting to critical conditions (e.g., crash conditions) set forth in FAA 25.562), seat manufacturers typically deal with substantial design, production, and certification costs.

What is needed is a system for attaching aircraft seats that reduces or eliminates traditional seat tracks. Further, a system that simplifies the seat installation and certification process, as well as the refurbishing and upgrading process, is also needed. Still further, a system that simplifies the design, production, and certification process for aircraft seat suppliers is also needed.

SUMMARY

In one example, a fuselage is described that includes a plurality of frames and a plurality of seat rows spaced apart according to a seat pitch. Each frame includes a lateral floor beam, and each seat row of the plurality of seat rows includes a load-bearing structural base with a plurality of legs attached to a proximal lateral floor beam and a distal lateral floor beam. Each seat row also includes a seat or bank of seats attached to the load-bearing structural base, where the seat or bank of seats comprises at least one seat bottom and at least one seat back. Further, each seat row includes an interface between (i) the load-bearing structural base and (ii) the seat or bank of seats to allow for attachment and detachment of the seat or bank of seats relative to the load-bearing structural base.

In another example, a fuselage is described that includes a first frame comprising a proximal lateral floor beam and a second frame comprising a distal lateral floor beam. The first frame and the second frame are spaced apart according to a frame pitch. The fuselage also includes a seat row comprising a load-bearing structural base with a plurality of legs attached to the proximal lateral floor beam and the distal lateral floor beam through a plurality of connection fittings. Each connection fitting comprises a first portion connected to one of the plurality of legs and a second portion connected to the proximal lateral floor beam or the distal lateral floor beam, and at least one of the plurality of legs is aligned with the proximal lateral floor beam or the distal lateral floor beam.

In yet another example, a method of attaching a seat or bank of seats to an aircraft is described. The method includes providing a first frame having a proximal lateral floor beam and providing a second frame having a distal lateral floor beam. The method further include providing a load-bearing structural base comprising a plurality of legs and an interface to allow for attachment and detachment of a seat or bank of seats relative to the load-bearing structural base, where the seat or bank of seats comprises at least one seat bottom and at least one seat back. The method also includes, prior to attaching the seat or bank of seats to the load-bearing structural base, attaching the load-bearing structural base to the proximal lateral floor beam and the distal lateral floor beam without use of a seat track.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings. Furthermore, drawings having like reference numerals indicate similar elements.

FIG. 10 illustrates a side-sectional view of the example load-bearing structural base of FIG. 8, according to an example embodiment.

FIG. 11 illustrates a side-sectional view of a front leg of the example load-bearing structural base of FIG. 8, according to an example embodiment.

FIG. 12 illustrates a side-sectional view of a back leg of the example load-bearing structural base of FIG. 8, according to an example embodiment.

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

As mentioned above, current systems and methods for installing aircraft seats have a number of drawbacks. The methods and systems in accordance with the present disclosure beneficially provide improved methods and systems for installing aircraft seats. In one example, a fuselage is described that includes a plurality of frames and a plurality of seat rows spaced apart according to a seat pitch. Each frame includes a lateral floor beam, and each seat row of the plurality of seat rows includes a load-bearing structural base with a plurality of legs attached to a proximal lateral floor beam and a distal lateral floor beam. Each seat row also includes a seat or bank of seats attached to the load-bearing structural base, where the seat or bank of seats comprises at least one seat bottom and at least one seat back. Further, each seat row includes an interface between (i) the load-bearing structural base and (ii) the seat or bank of seats to allow for attachment and detachment of the seat or bank of seats relative to the load-bearing structural base. In an example embodiment, the plurality of legs are attached to the proximal lateral floor beam and the distal lateral floor beam without attachment to a seat track.

The disclosed systems and methods beneficially reduce or eliminate seat tracks in an aircraft, which may in turn substantially reduce the overall weight of an aircraft. The disclosed systems and methods also simply the seat installation and certification process, as well as the refurbishing and upgrading process.

Figure 1:
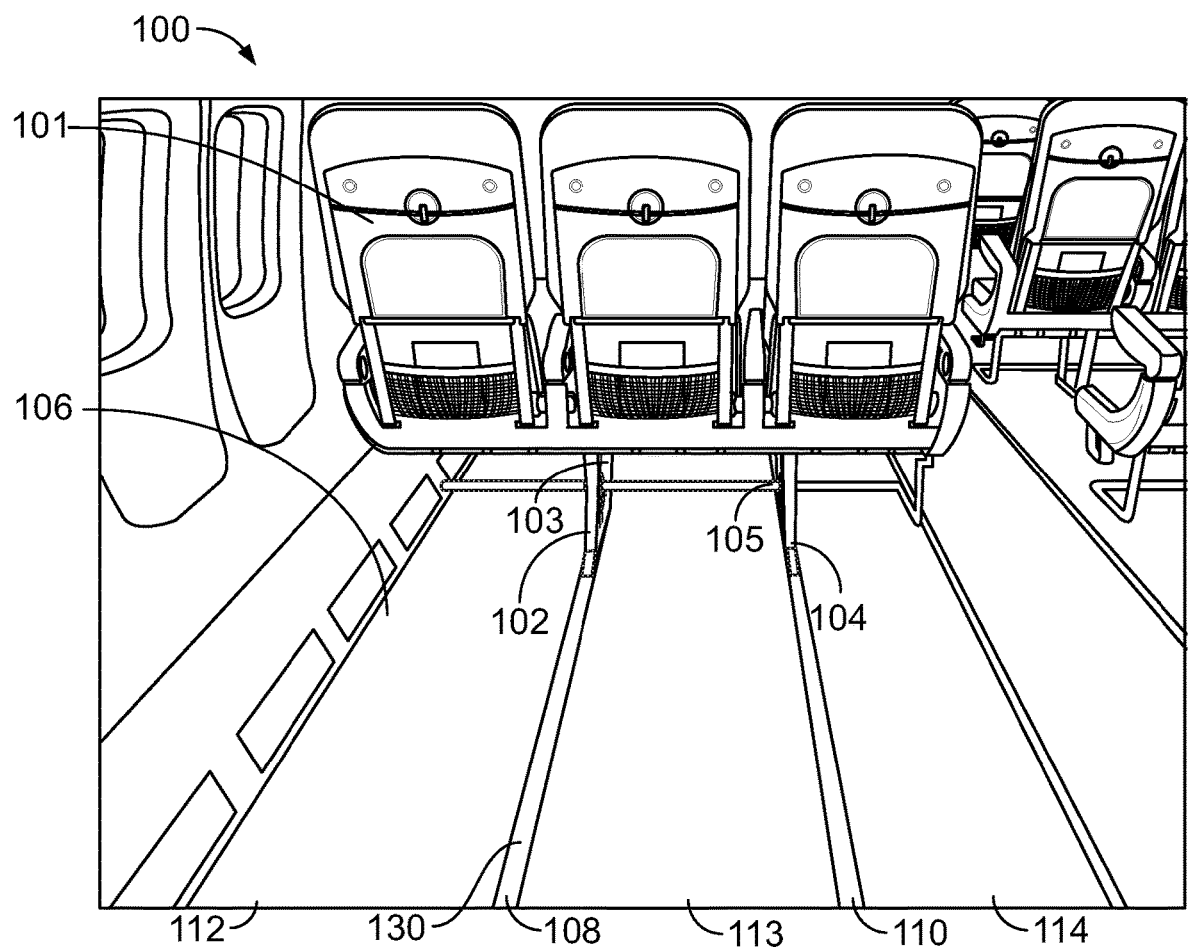
FIG. 1 illustrates a perspective view of an example prior art bank of seats attached to prior art seat tracks.
Figure 2:
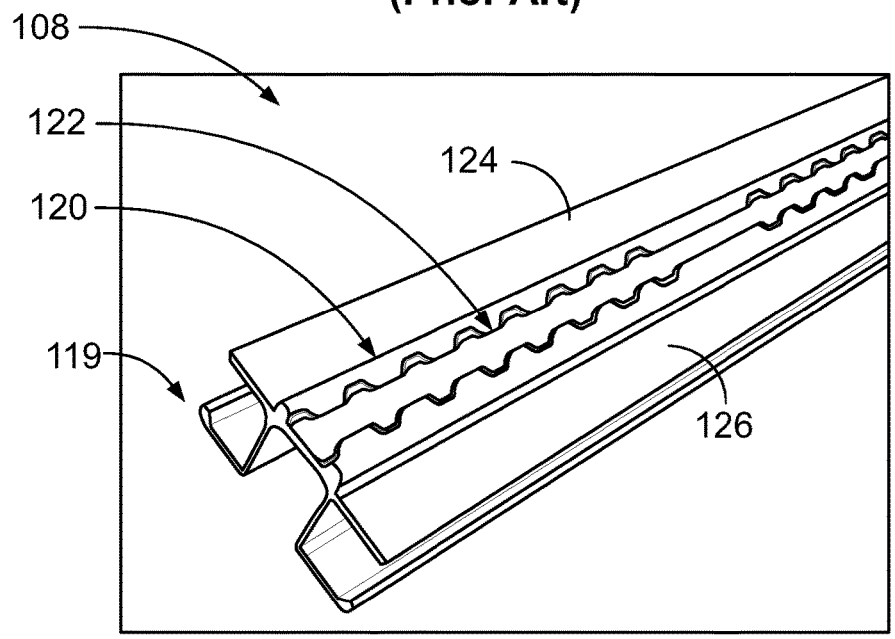
FIG. 2 illustrates a perspective view of a prior art seat track of FIG. 1.
Figure 3B:
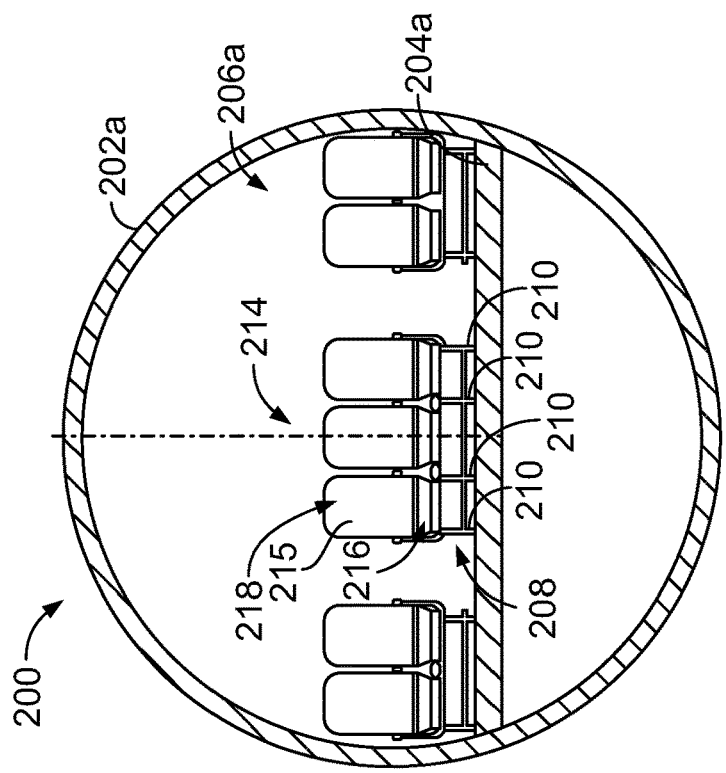
FIG. 3B illustrates a cross-sectional view of the example fuselage of FIG. 3A, according to an example embodiment.
Figure 3A:
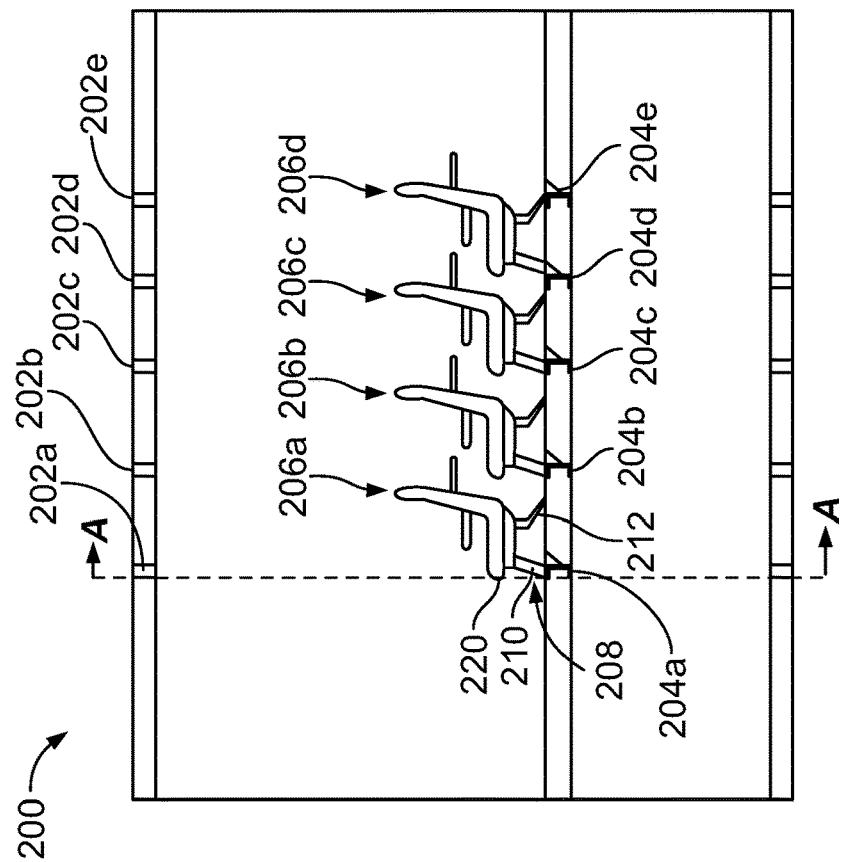
FIG. 3A illustrates a side sectional view of an example fuselage, according to an example embodiment.

Referring now to FIGS. 3A-B, a section of an example fuselage 200 is illustrated. FIG. 3A is a side-sectional view of fuselage 200, and FIG. 3B is a cross-sectional view of fuselage 200 along line AA. The fuselage 200 includes a plurality of frames 202a-e and each frame comprises a lateral floor beam 204a-e. Fuselage 200 also includes a plurality of seat rows 206a-d spaced apart according to a seat pitch.

Each seat row 206a-d includes a load-bearing structural base with a plurality of legs attached to a proximal lateral floor beam and a distal lateral floor beam. For example, seat row 206a includes load-bearing structural base 208 attached to proximal lateral floor beam 204a and distal lateral floor beam 204b. Load-bearing structural base 208 includes four front legs 210 attached to proximal lateral floor beam 204a and four rear legs 212 attached to distal lateral floor beam 204b.

Although load-bearing structural base 208 includes four front legs 210 and four rear legs 212, in other examples the load-bearing structural base 208 may include more or fewer legs. In an example embodiment, the load-bearing structural base 208 includes two front legs and two rear legs. Other examples are possible as well. Further, in an example embodiment, the number of legs of load-bearing structural base 208 may depend on the number of seats supported by the load-bearing structural base 208.

Load-bearing structural base 208 may be formed from any suitable material. In an example embodiment, the load-bearing structural base 208 is formed from metal (e.g., aluminum, titanium, steel, and/or a metallic alloy) and/or composite materials (e.g., composite fiber, composite resin, thermoset composite, thermoplastic composite (e.g., polyether ether ketone (PEEK) composite), graphite composite, and/or fiberglass composite. In another example embodiment, the load-bearing structural base 208 is formed from fiber-based materials such as para-aramid synthetic fiber or fiber-metallic laminate. Other materials are possible as well. Load-bearing structural base 208 may also be formed using any suitable manufacturing process, including without limitation forging, extrusion, bonding, curing, composite braiding, and composite stitching.

Each seat row 206a-d also includes a seat or bank of seats attached to the load-bearing structural base, and the seat or bank of seats includes at least one seat bottom and at least one seat back. For example, with reference to FIG. 3B, seat row 206a includes bank of seats 214 attached to load-bearing structural base 208. Bank of seats 214 includes three seats 215 each having a seat bottom 216 and a seat back 218. Although bank of seats 214 includes three seats, more or fewer seats may be attached to load bearing structural base 208. For instance, in an example embodiment, a single seat is attached to load bearing structural base 208. In another example, two seats are attached to load bearing structural base 208. In yet another example, four or more seats are attached to load bearing structural base 208.

Each seat row 206a-d includes an interface between (i) the load-bearing structural base and (ii) the seat or bank of seats to allow for attachment and detachment of the seat or bank of seats relative to the load-bearing structural base. For example, seat row 206a includes an interface 220 between load-bearing structural base 208 and bank of seats 214 that allows for attachment and detachment of the entire bank of seats 214 relative to the load-bearing structural base 208.

Figure 4:
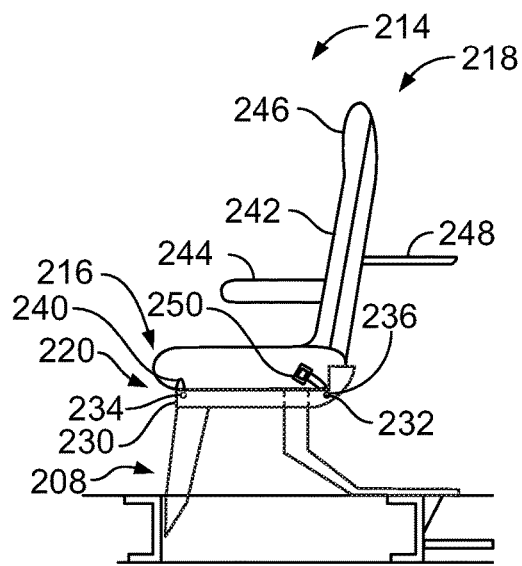
FIG. 4 illustrates a side view of a bank of seats attached to a load-bearing structural base, according to an example embodiment.
Figure 5:
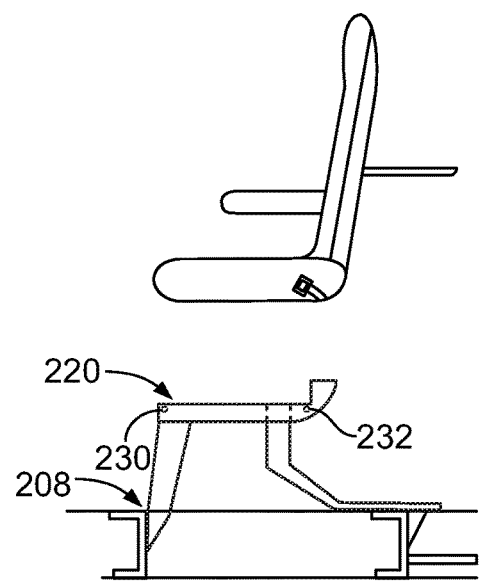
FIG. 5 illustrates a side view of the bank of seats of FIG. 4 detached from the load-bearing structural base, according to an example embodiment.

Interface 220 may be any suitable interface that allows for attachment and detachment of the entire bank of seats 214 relative to the load-bearing structural base 208. An example interface 220 is described with reference to FIGS. 4 and 5. FIG. 4 is a side view of bank of seats 214 attached to load-bearing structural base 208, and FIG. 5 is a side view of bank of seats 214 fully detached from load-bearing structural base 208. In the example of FIGS. 4-5, interface 220 includes a plurality of holes 230, 232 in the load-bearing structural base 208 and a plurality of fasteners 234, 236 that releasably attach the bank of seats 214 to the load-bearing structural base 208. The plurality of holes 230, 232 may be arranged in any suitable geometric hole pattern to secure bank of seats 214 to load-bearing structural base 208.

Further, any suitable fastener may be used to releasably attach the bank of seats 214 to the load-bearing structural base 208. In an example, fasteners 234, 236 are nuts and bolts. In other examples, the fasteners include screws, snap-fit connectors, buttons, and/or hooks. Other examples are possible as well.

The bank of seats 214 attached to the load-bearing structural base 208 may take a variety of forms. For instance, in the example of FIG. 4, the seat bottom 216 in each seat 215 in bank of seats 214 includes seat bottom cushion 240. Further, the seat back 218 in each seat 215 includes seat back cushion 242. Each seat further includes armrest 244, headrest 246, tray table 248, and seat belt 250. In other example embodiment, the seats may include literature pockets, audiovisual systems, lights, vent or air conditioning means, data ports, power ports, and lumbar supports. Other example seat features are possible as well.

As explained above, interface 220 allows for attachment and detachment of the entire bank of seats 214 relative to the load-bearing structural base 208. In an example, the entire bank of seats includes all of the seat features that are connected to the load-bearing structural base 208 via interface 220. For instance, in the example of FIGS. 4 and 5, the entire bank of seats includes the seat bottom 216, seat bottom cushion 240, seat back 218, seat back cushion, armrest 244, headrest 246, tray table 248, and seat belt 250 for each seat 215. In an example embodiment, this allows for a seat supplier to design and manufacture all of the seat features to be attached to the load-bearing structural base, while the airline manufacturer designs and manufactures the load-bearing structural base for the entire bank of seats. This allows the airline manufacturer to install and attach the load-bearing structural base to the lateral floor beams before receiving the seats from the seat supplier, which helps to make the aircraft build sequence more efficient.

Figure 6:
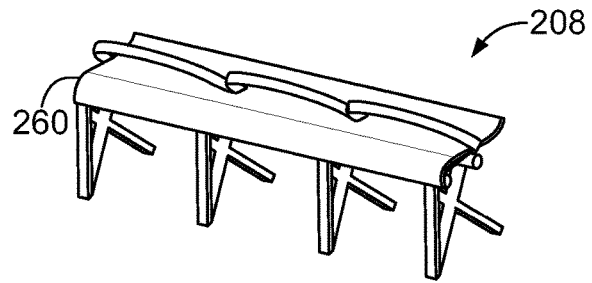
FIG. 6 illustrates a perspective view of an example load-bearing structural base, according to an example embodiment.
Figure 7:
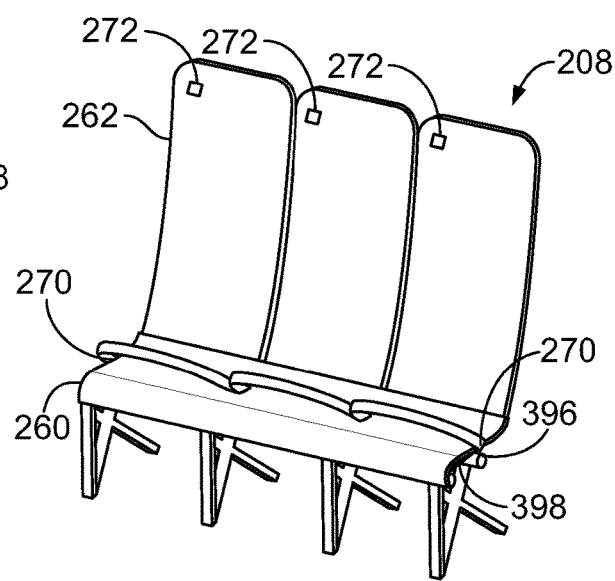
FIG. 7 illustrates a perspective view of an example load-bearing structural base, according to an example embodiment.

In an example embodiment, the load bearing structural base 208 includes a seat pan base to support the seat bottoms 216 and/or a seat back frame to support the seat backs 218. For example, with reference to FIGS. 4-6, load-bearing structural base includes 208 seat pan base 260 to support seat bottoms 216. Further, FIG. 7 illustrates load-bearing structural base 208 including seat back frame 262. In an example where load-bearing structural base 208 includes seat back frame 262, seat back 218 may be installed over and around the seat back frame 262. For instance, with reference to FIGS. 4 and 7, the seat back 218 is installed over and around seat back frame 262 so that seat back cushion 242 is on a proximal side of seat back frame 262, and tray table 248 is on a distal side of seat back frame 262.

In the example of FIG. 7, the interface 220 includes one or more fasteners to attach and detach the seat bottom cushions 242 to the seat pan base 260 and the seat back cushion 242 to the seat back frame 262. Example fasteners include screws, nuts and bolts, buttons, hooks, hook-and-loop fasteners, zippers, locks, and cable ties. Other fasteners are possible as well. In the example of FIG. 7, the entire bank of seats includes all of the seat features that are connected to the load-bearing structural base 208 (which includes seat pan base 260 and seat back frame) via interface 220.

In an example embodiment, the load-bearing structural base 208 also includes seat belt attachment points and/or shoulder belt attachment point. For instance, with reference to FIG. 7, load-bearing structural base includes seat belt attachment points 270 and shoulder belt attachment points 272. In an example, each seat belt attachment point 270 is aligned with one of the legs of the load-bearing structural base (see also FIG. 8). Aligning the seat belt attachment points 270 with the legs helps to reduce the overall weight of the aircraft. In prior systems, seat legs are typically offset from the seat belt attachment member of the seat, and a load-transfer beam is provided to transfer the load from the seat belt attachment to the seat leg and down into the floor structure. However, by providing a load-bearing structural base 208 having seat belt attachment points 270 aligned with the legs, use of such a load-transfer beam can be avoided, which helps to reduce the overall weight of the seat and thereby that of the aircraft. In addition, by aligning seat belt attachments to the legs, the overall load to each leg attachment to the aircraft is reduced, thereby reducing the weight of the aircraft attaching structure.

In an example embodiment, the seat pan base 260 and the seat back frame 262 are formed from flexible materials that provide a dampening effect to the passenger and permit flexing and distortion. By permitting flexing and distortion, the seat pan base 260 and seat back frame 262 may reduce stress applied to the rest of the load-bearing structural base 208. In an example embodiment, the flexible materials are composite materials. Thermoplastic composites tend to be more flexible than thermoset composites. In an example, resin systems such as PEEK, Polyetherketoneketone (PEKK), polyetherimide (PEI), polyphenylsulfone (PPSU) and Polyphenylene sulfide (PPS) are suitable for aircraft interior use. For high strength to weight ratio, carbon fiber reinforcement may be used. As another example, para-aramid synthetic fibers, which are both flexible and tear resistant, may also be used.

Although in the example of FIG. 7, the seat pan base 260 and the seat back frame 262 are depicted as having a solid framework, in other examples the seat pan base 260 and seat back frame 262 may take other forms. For instance, in an example embodiment, the seat pan base 260 and/or the seat back frame 262 have a grid-based framework rather than a solid framework. Further, although in FIG. 7 the seat back frame 262 is illustrated as being structurally integral to the seat pan base 260, in other embodiments the seat back frame 262 is not structurally integral to the seat pan base 260. Rather, the seat back frame 262 may be fastened to the seat pan base 260.

Returning to FIG. 3A, in an example embodiment, the plurality of legs 210, 212 of the load-bearing structural base 208 are attached to the proximal lateral floor beam 204a and the distal lateral floor beam 204b without attachment to a seat track. In particular, rather than attaching the plurality of legs of the load-bearing structural base 208 to an exposed seat track that includes numerous fittings for selectively positioning (e.g., every inch) legs 210, 212 along the seat track, the legs 210, 212 are instead attached to fixed points in the floor structure of the aircraft. By attaching legs 210, 212 to fixed points, seat tracks which provide for selective longitudinal placement at numerous points along the seat track can be eliminated. As mentioned above, seat tracks and floor surface panels are flush or substantially flush with one another.

By the term "substantially flush" it is meant that the recited characteristic need not be achieved exactly, but that deviations or variations, including for example, tolerances, measurement error, measurement accuracy limitations and other factors known to skill in the art, may occur in amounts that do not preclude the effect the characteristic was intended to provide. In an example, the seat tracks and floor surface panels are substantially flush with one another when the top of the seat track and the top of the floor panel are within 0.25 inches of one another.

The legs 210, 212 may be attached to the proximal lateral floor beam 204a and the rear legs 212 distal lateral floor beam 204b without attachment to a seat track in various ways. Example embodiments are described in detail with reference to FIGS. 8-20.

Figure 8:
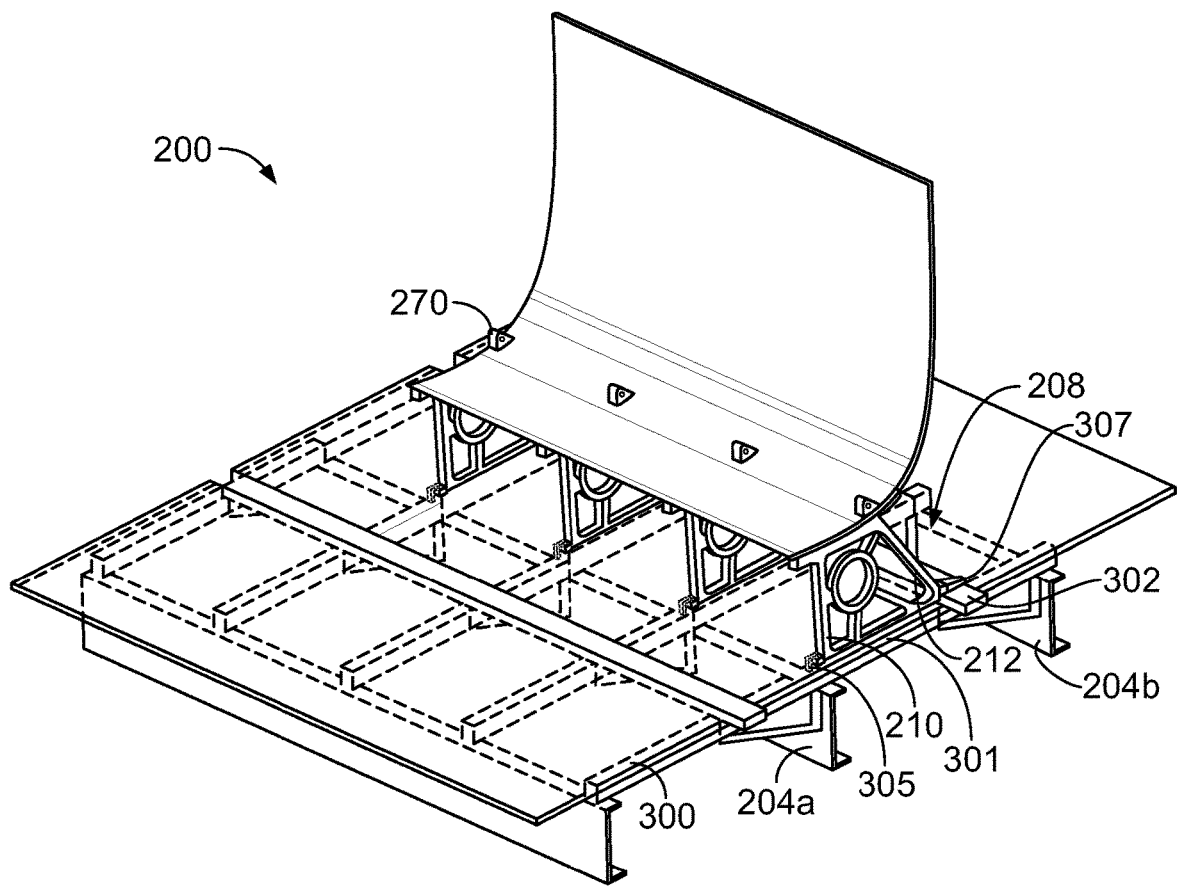
FIG. 8 illustrates a front-perspective view of an example load-bearing structural base attached to lateral floor beams, according to an example embodiment.
Figure 9:
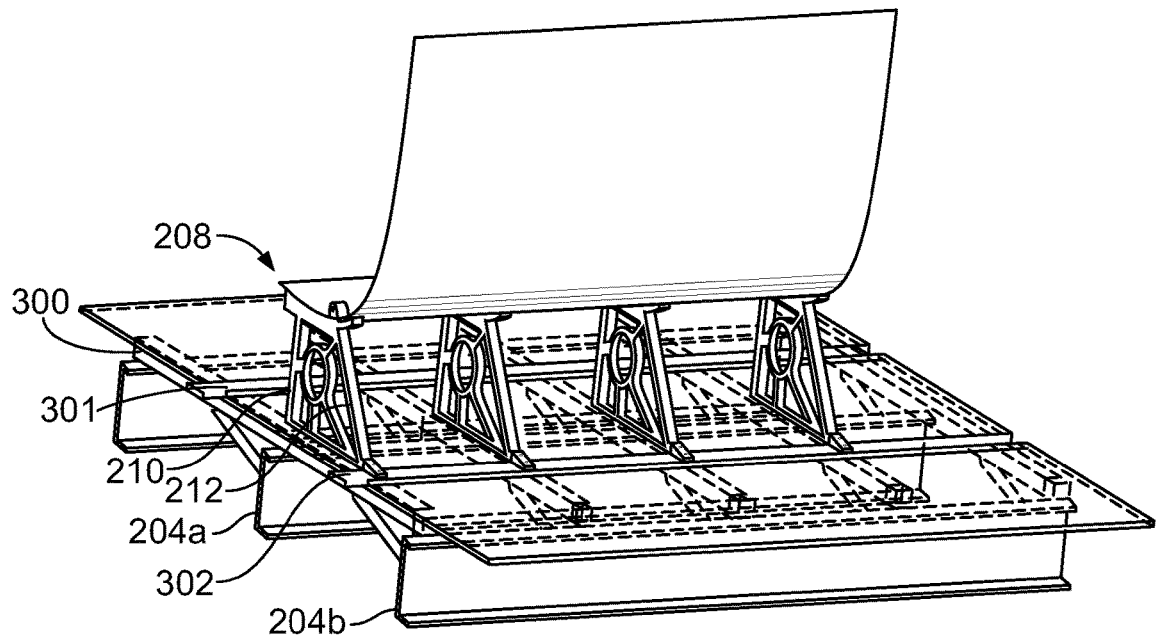
FIG. 9 illustrates a back-perspective view of the example load-bearing structural base of FIG. 8, according to an example embodiment.

FIGS. 8-12 illustrate a first example embodiment of load-bearing structural base 208 attached to the proximal lateral floor beam 204a and distal lateral floor beam 204b without attachment to a seat track. With reference to FIGS. 8-10, the fuselage 200 includes at least one longitudinal floor-panel support beam 300 positioned below floor surface panel 301. The at least one longitudinal floor-panel support beam 300 is attached to the proximal lateral floor beam 204a and the distal lateral floor beam 204b. Fuselage 200 further includes a transverse anchor beam 302 attached to the at least one longitudinal floor-panel support beam 300. Front leg 210 is attached to the longitudinal floor-panel support beam 300 at fixed point 305 and rear leg 212 is attached to the transverse anchor beam 302 at fixed point 307.

In an example embodiment, the longitudinal floor-panel support beam 300 and the transverse anchor beam 302 are roll-formed hat channels. In an example, the roll-formed hat channels are formed from stainless steel or titanium. Compared to seat tracks, roll-formed hat channels are substantially less complex and are thus less costly to manufacture. For instance, by roll-forming the hat channels, the aircraft manufacturer may utilize sheet material or flat stock. On the other hand, current seat tracks are highly machined and processed assemblies. For instance, seat tracks for the Boeing® 787 aircraft are fully machined titanium forgings, and approximately 90% of the forgings are machined away for the final product. Therefore, utilizing beams such as longitudinal floor-panel support beam 300 and the transverse anchor beam 302 to provide fixed points for attaching the legs may reduce costs associated with attaching seats to an aircraft floor compared to traditional methods utilizing seat tracks. Further, by using roll-formed hat channels rather than seat tracks, a weight savings can be obtained as well.

Any suitable fastener may be used to attach the front leg 210 and the rear leg 212 to the fixed points 305, 307 in the aircraft floor structure. For instance, with reference to FIG. 11, front leg 210 is attached to the longitudinal floor-panel support beam 300 with bolts 310 and nut plate 312. In this example, front leg 210 includes a toe 314 that engages slip 316, and slip 316 is attached to the longitudinal floor-panel support beam 300 with bolts 310 and nut plate 312. In other examples, however, the front leg 210 may be directly attached to the longitudinal floor-panel support beam 300 without use of a slip. Further, with reference to FIG. 12, rear leg 212 is attached to the transverse anchor beam 302 with bolts 318 and nut plate 320.

In order to bridge the connection between rear leg 212 and distal lateral floor beam 204b, a seat load transfer intercostal is provided below the transverse anchor beam 302. For instance, with reference to FIG. 10, a wedge-shaped plate 326 is attached to the distal lateral floor beam 204b and the longitudinal floor-panel support beam 300. Although plate 326 is illustrated as having a wedge shape, other shapes are possible as well. For instance, in another example embodiment, the plate 326 is rectangular shaped.

The front leg 210 is aligned with the floor beam 204a, and the rear leg 212 is aligned with the transverse anchor beam 302. Under a threshold high load (e.g., a crash load), front leg 210 may tend to be forced downward while rear leg 212 may tend to be forced upward. By aligning front leg 210 with the floor beam 204a, the front-leg load is directly transferred to the floor beam 204a and the floor beam 204a helps to prevent the front leg 210 from being moved downward. Further, the wedge-shaped plate 326 helps to prevent the rear leg 212 from being moved upward.

In other example embodiments, rather than attaching legs 210 and 212 to the lateral floor beams through longitudinal floor-beam support beams positioned below the floor surface panels, the legs 210 and 212 may be attached to the lateral floor beams in other ways. In another example embodiment, the plurality of legs of the load-bearing structural base are attached to the proximal lateral floor beam and the distal lateral floor beam through a plurality of connection fittings that each have a length substantially less than the seat pitch. Since these connection fittings have a length substantially less than the seat pitch and allow for attaching the plurality of legs to the proximal lateral floor beam and the distal lateral floor beam without attachment to a seat track, the connection fittings beneficially reduce the overall weight of the aircraft.

Figure 13:
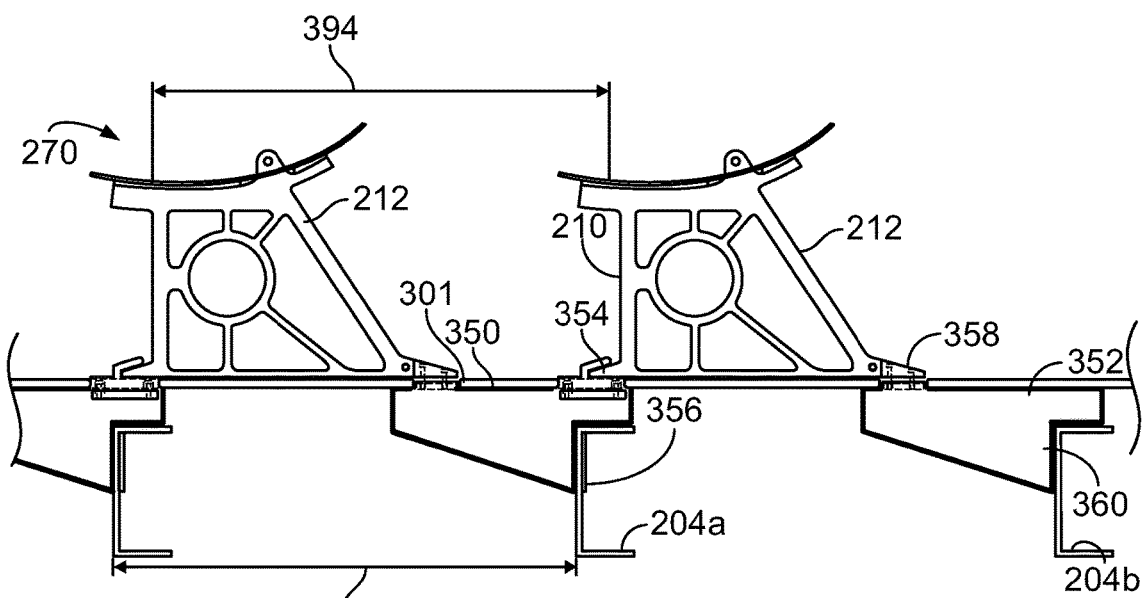
FIG. 13 illustrates a side-sectional view of example connection fittings, according to an example embodiment.
Figure 14:
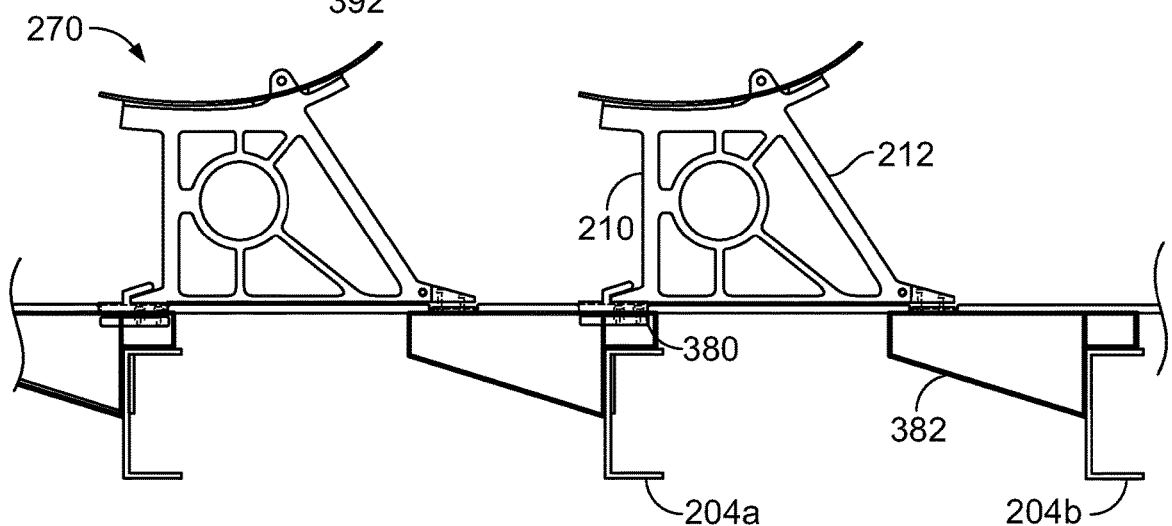
FIG. 14 illustrates a side-sectional view of example connection fittings, according to an example embodiment.
Figure 15:
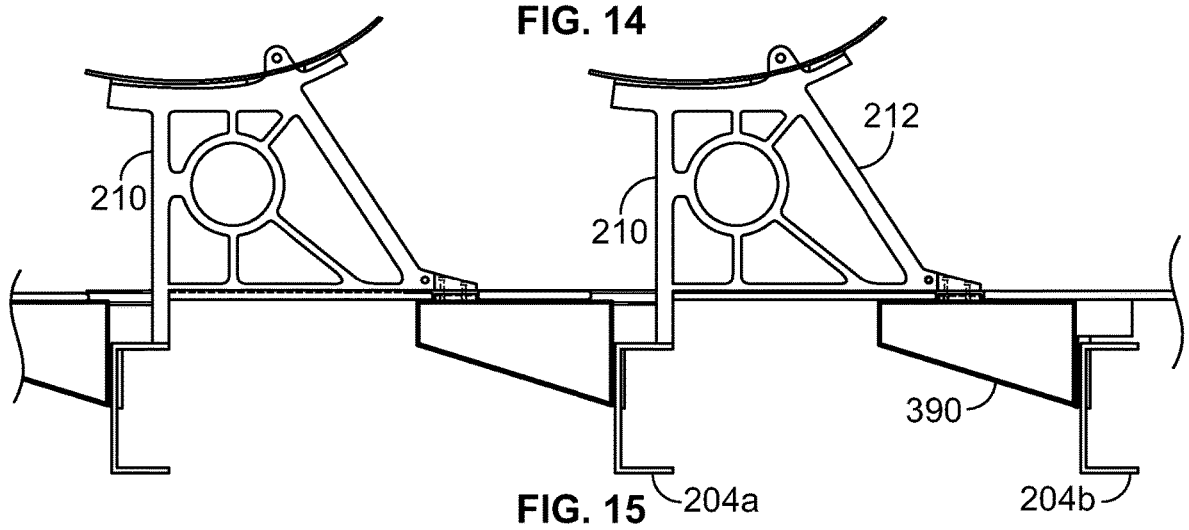
FIG. 15 illustrates a side-sectional view of an example leg integrally formed with a lateral floor beam, according to an example embodiment.
Figure 16:
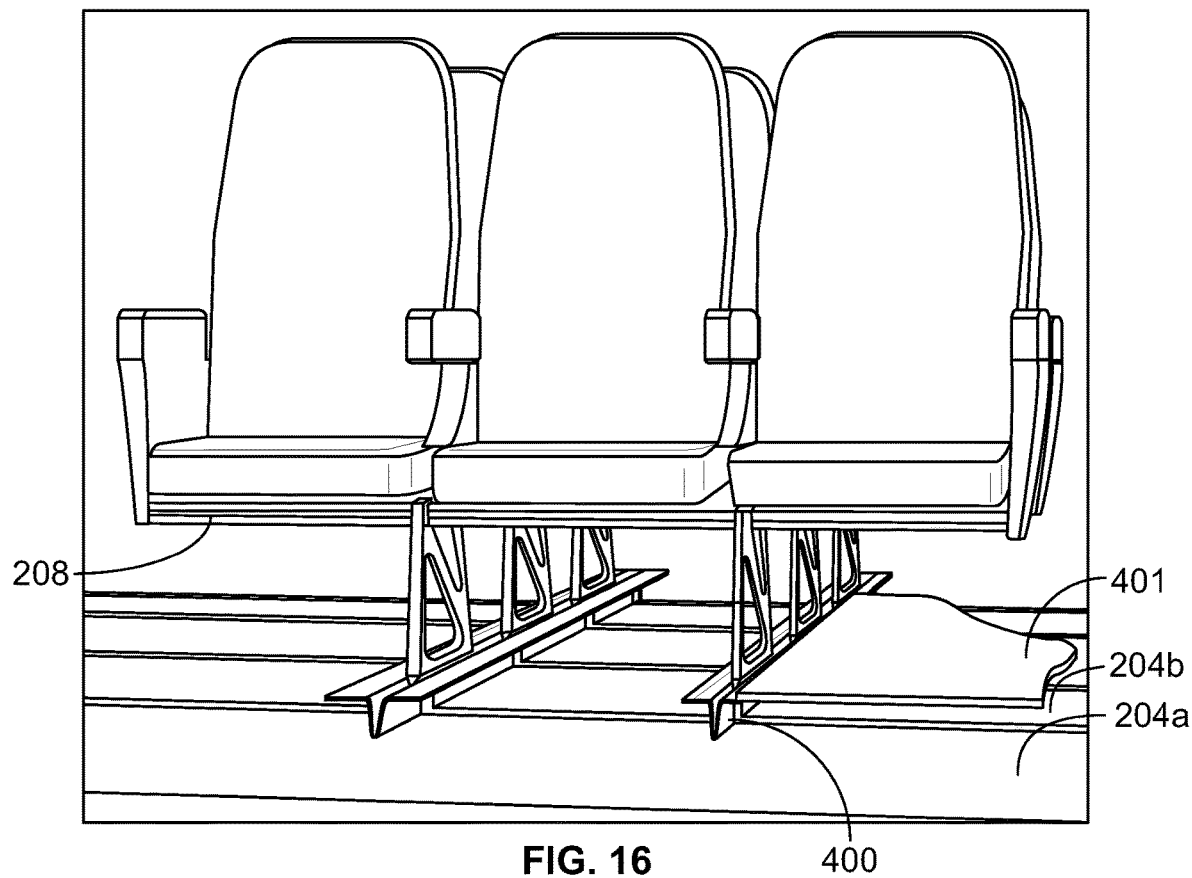
FIG. 16 illustrates a front-perspective view of an example load-bearing structural base attached to lateral floor beams, according to an example embodiment.

Example connection fittings having a length substantially less than the seat pitch are shown in FIGS. 13-15. FIG. 13 illustrates legs 210, 212 of load-bearing structural base 208 attached to proximal lateral floor beam 204a and distal lateral floor beam 204b through connection fittings 350 and 352. Connection fitting 350 includes a first portion 354 connected to front leg 210 and a second portion 356 connected to proximal lateral floor beam 204a. First portion 354 is connected to front leg 210 at a level above floor surface panel 301, and second portion 356 is connected to proximal lateral floor beam 204a at a level below floor surface panel 301. Similarly, connection fitting 352 includes a first portion 358 connected to rear leg 212 and a second portion 360 connected to distal lateral floor beam 204b. First portion 358 is connected to rear leg 212 at a level above floor surface panel 301, and second portion 360 is connected to distal lateral floor beam 204b at a level below floor surface panel 301. As used herein, the level above floor surface panel 301 is a point above what is commonly known as "water level or z-axis" in aerospace parlance, and the level below floor surface panel 301 is a point below the water level or z-axis.

In this example embodiment of FIG. 13, the first connection fitting 350 also serves to connect the rear leg 212 of the proximal adjacent seat row 370, and the second connection fitting 352 also serves to connect the front leg of the distal adjacent seat row (not shown).

The connection fittings 350 and 352 may be attached to the load-bearing structural base 208 and floor beams 204a, 204b in any suitable way. In an example, the connection fittings 350 and 352 are attached to the load-bearing structural base 208 and floor beams 204a, 204b with fasteners such as nuts and bolts. Other fasteners are possible as well. In another example, the connection fittings 350 and 352 are attached directly to the floor beams. In yet another example, the connection fittings 350 and 352 are attached to brackets attached to the floor beams 204a, 204b.

Connection fittings 350 and 352 each have a length substantially less than the seat pitch. As used herein, a connection fitting has a length "substantially less" than the seat pitch if the connection fitting has a length that is equal to or less than 50% of the seat pitch. The length of connection fittings 350 and 352 may be selected based on the seat pitch and/or the distance between front leg 210 and rear leg 212. As a particular example, a common seat pitch in economy class may be approximately 30 inches and a common distance between front leg 210 and rear leg 212 may be approximately 17 inches. In such an example, the length of connection fitting 350 or 352 would then be approximately 13 inches. Other example seat pitches, distances between front and rear legs, and connection-fitting lengths are possible as well.

By the term "approximately" it is meant that the recited parameter or value need not be achieved exactly, but that deviations or variations, including for example, tolerances, measurement error, measurement accuracy limitations and other factors known to skill in the art, may occur in amounts that do not preclude the effect the parameter or value was intended to provide. As used herein, "approximately X inches" means any distance in the range of X inches +/−0.1*(X inches).

FIG. 14 illustrates other example connection fittings that have a length substantially less than the seat pitch. In particular, FIG. 14 illustrates legs 210, 212 of load-bearing structural base 208 attached to proximal lateral floor beam 204a and distal lateral floor beam 204b through connection fittings 380 and 382. Connection fittings 380 and 382 are similar in many respects to connection fittings 350, 352 and thus are not described in as great of detail. However, in this example, rather than having legs of adjacent rows attached to the same connection fitting, the legs 210, 212 of adjacent seat rows each have a dedicated connection fitting.

In yet another embodiment, rather than being attached with connection fittings, one or more of the plurality of legs of the load-bearing structural base 208 may be integrally formed with the proximal lateral floor beam 204a or distal lateral floor beam 204b. For instance, as shown in FIG. 15, leg 210 is integrally formed with proximal lateral floor beam 204a and rear leg 212 is attached to distal later floor beam through connection fitting 390. The leg 210 may be integrally formed with the proximal lateral floor beam 204a in any suitable fashion. In an example embodiment, the leg 210 is welded or cured to the proximal later floor beam 204a. Although FIG. 15 illustrates front leg 210 integrally formed with the floor beam, in other example embodiments, rear leg 212 is integrally formed with distal lateral floor beam 204b.

FIGS. 16-20 illustrate another example embodiment of attaching load-bearing structural base 208 to the lateral floor beams 204a, 204b without attaching to traditional seat tracks. In the example of FIGS. 16-20, the floor structure includes longitudinal floor-panel support beams positioned below the floor surface panels, and the load-bearing structural base is integrated in the longitudinal floor-panel support beams positioned below the floor surface panels. In particular, with reference to FIG. 16, longitudinal floor-panel support beam 400 is positioned below floor surface panel 401. The legs 210, 212 of load-bearing structural base 208 are each attached to fixed points in floor-panel support beam 400, and floor-panel support beam 400 is attached to proximal lateral floor beam 204a and distal lateral floor beam 204b. In particular, floor-panel support beam 400 is attached to proximal lateral floor beam 204a through a bracket 403 (see FIG. 18) on the proximal lateral floor beam 204a. Similarly, floor-panel support beam 400 is attached to distal lateral floor beam 204b through a bracket 405 (see FIG. 18) on the distal lateral floor beam 204b.

Figure 17:
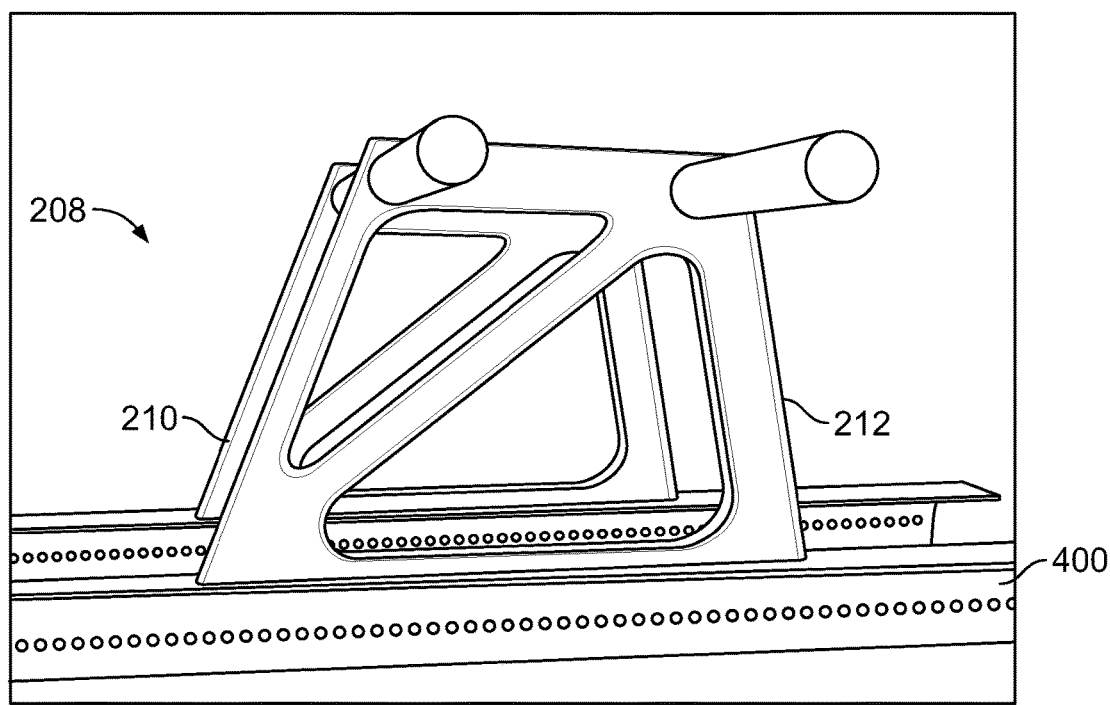
FIG. 17 illustrates a perspective view of the example load-bearing structural base of FIG. 16, according to an example embodiment.
Figure 18:
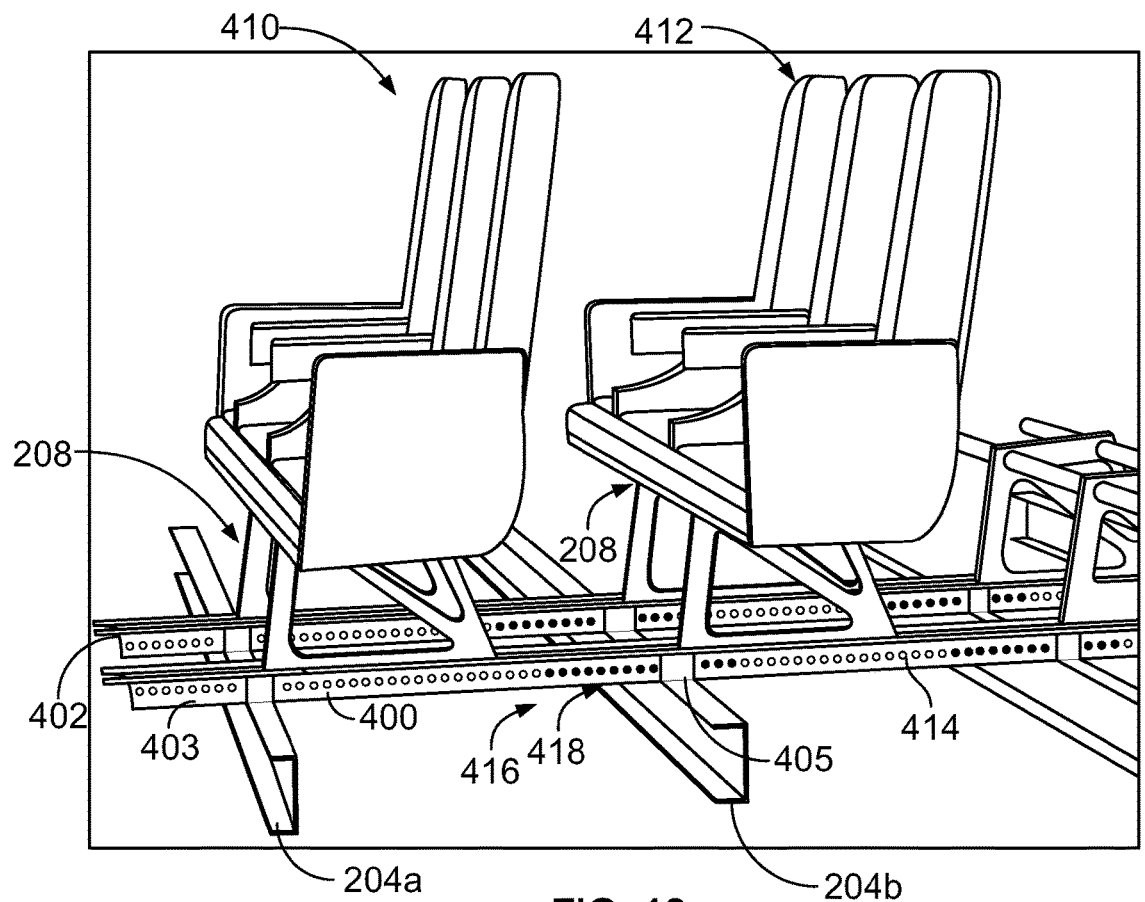
FIG. 18 illustrates a perspective view of the example load-bearing structural base of FIG. 16 attached to lateral floor beams, according to an example embodiment.

As shown in FIG. 17, the legs 210, 212 of load-bearing structural base 208 are integrally formed with floor-panel support beam 400. In an example embodiment, the legs 210, 212 are welded or cured to the floor-panel support beam 400. However, in another example embodiment, the legs are fastened to floor-panel support beam 400 at the fixed points in the floor-panel support beam 400.

In the example embodiment of FIGS. 16-20, each load-bearing structural base 208 for seats or banks of seats in adjacent rows may be attached to different floor-panel support beams, and these floor-panel support beams may be nested together during assembly. For instance, with reference to FIG. 18, load-bearing structural base 208 of first seat row 410 is attached to floor-panel support beam 400, and load-bearing structural base 208 of second seat row 412 is attached to floor-panel support beam 414. A distal end 416 of floor-panel support beam 400 is nested with a proximal end 418 of floor-panel support beam 414.

Figure 19:
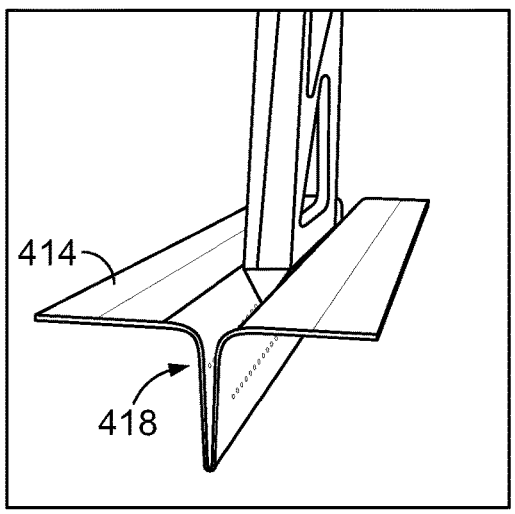
FIG. 19 illustrates a perspective view of a proximal end of an example floor-panel support beam, according to an example embodiment.
Figure 20:
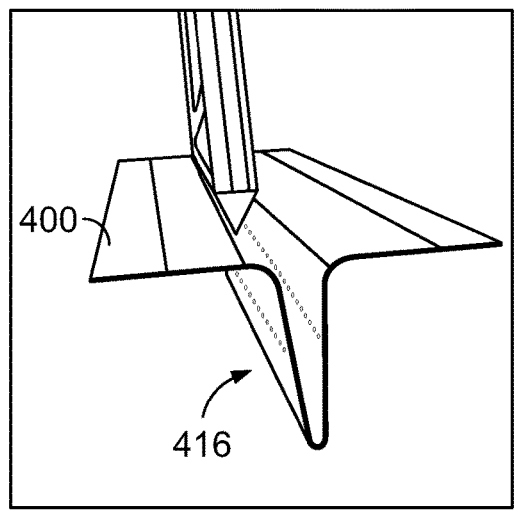
FIG. 20 illustrates a perspective view of a distal end of an example floor-panel support beam, according to an example embodiment.

The floor-panel support beams 400, 414 may be nested with one another in any suitable fashion. In an example embodiment, the proximal end 418 of floor-panel support beam 414 is shaped to slide into distal end 416 of floor-panel support beam 400. For instance, with reference to FIGS. 19-20, distal end 416 is V-shaped and proximal end 418 of floor-panel support beam 414 is T-shaped. The T-shaped proximal end 418 may slide into the V-shaped distal end 416, and then the two floor-panel support beams 400, 414 may be fastened together. It should be understood that the shapes illustrated in FIGS. 19-20 are intended as an example only, and other suitable shapes are possible as well.

In an example embodiment, the seat pitch between rows 410, 412 may be varied depending on how far the floor-panel support beams 400, 414 are nested with one another before they are fastened together.

As mentioned above, with the advent of fuselages formed with composite materials, frame pitch may be increased and selected to be in the range of approximately 28 to approximately 36 inches. Such frame pitches may also be suitable for the seat pitch in the aircraft. In an example embodiment, the fixed points at which the load-bearing structural base 208 are attached to the floor structure are selected so that the seat pitch is substantially the same as the frame pitch. Each seat row may then be located between adjacent frames.

By the term "substantially" it is meant that the recited characteristic need not be achieved exactly, but that deviations or variations, including for example, tolerances, measurement error, measurement accuracy limitations and other factors known to skill in the art, may occur in amounts that do not preclude the effect the characteristic was intended to provide. In an example, the frame pitch is substantially the same as the seat pitch when the frame pitch and the seat pitch are within 95% of one another.

In the examples illustrated in FIGS. 8-20, each load-bearing structural base 208 has the front leg 210 attached to and aligned with the proximal lateral floor beam 204a. The front legs of load-bearing structural bases in adjacent seat rows are also attached to and aligned with proximal lateral floor beams. Therefore, the seat pitch is substantially the same as the frame pitch. For instance, with reference to FIG. 13, the frame pitch 392 is substantially the same as the seat pitch 394. Although in the examples illustrated in FIGS. 8-20, the front leg 210 aligns with the proximal lateral floor beam 204a, in other example embodiments, the front leg 210 may be offset from the proximal lateral floor beam 204a.

Since the plurality of legs of the load-bearing structural base are attached at fixed points in the floor structure, the seat pitch when measured as the distance between the legs of adjacent seat rows legs will be fixed. While this seat pitch (measured as the distance between the legs of adjacent seat rows legs) is fixed, in example embodiments the seat pitch measured between the seat bottoms 216 and seat backs 218 of adjacent seat rows may be adjustable. In order to allow for adjusting this seat pitch measured between the seat bottoms and seat backs of adjacent seat rows, the seat or bank of seats may be configured to move relative to the plurality of legs of the load-bearing structural base 208.

In an example embodiment, in order to facilitate this relative movement, the seat pan base 260 is configured to adjust relative to the legs 210, 212. The seat pan base 260 may be configured to adjust relative to the legs 210, 212 of the load-bearing structural base 208 in any suitable fashion. In an example embodiment, the load-bearing structural base further includes at least one transverse beam 396 (see FIG. 7) fixedly attached to the plurality of legs and at least one rail 398 (see FIG. 7) fixedly attached to the seat pan base 260 and movably attached to the at least one transverse beam 396, such that the seat pan base 260 is movable relative to the at least one transverse beam 396 to adjust the seat pitch. In practice, this will allow for changing the seat pitch between bank of seats 214 while the seat pitch between the load-bearing structural bases 208 remains fixed.

Figure 21:
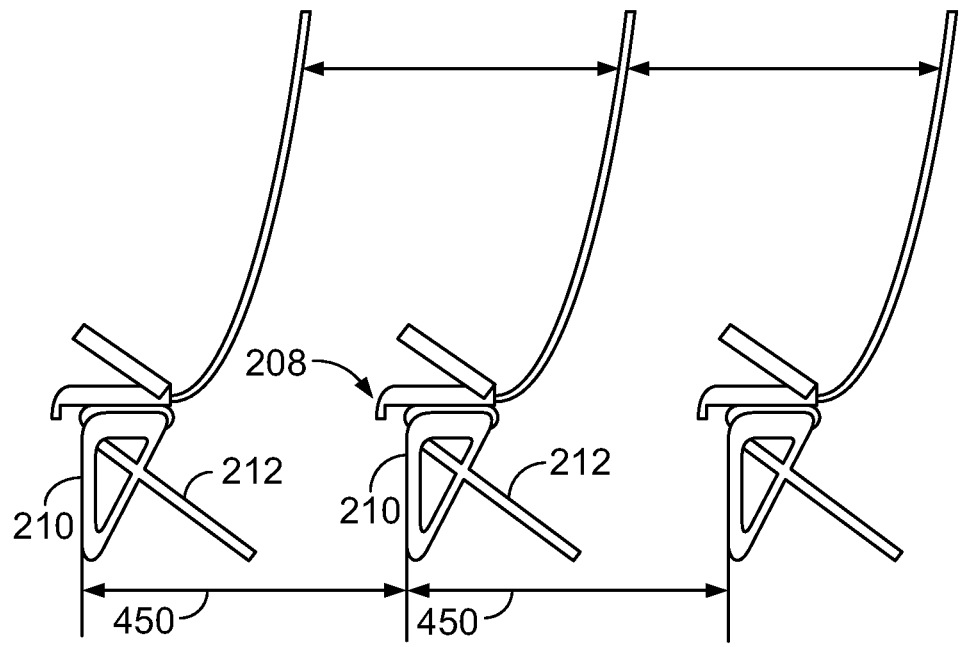
FIGS. 21 and 22 illustrate side-sectional views of a bank of seats attached to a load-bearing structural base, according to an example embodiment.
Figure 22:
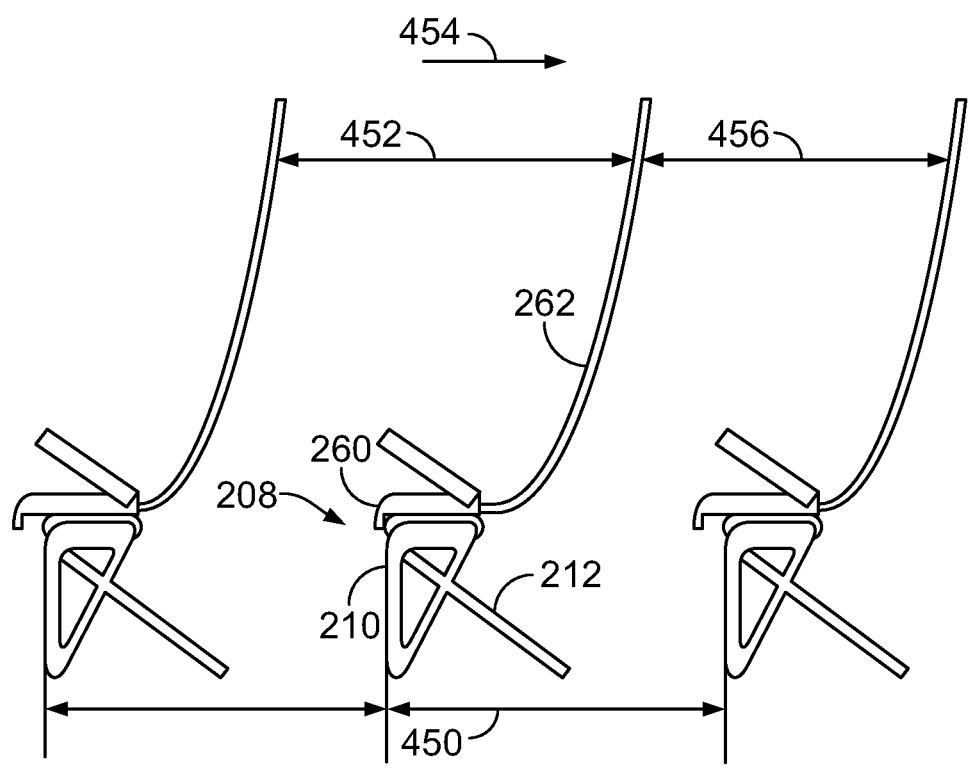

FIG. 21 illustrates an example where the seat pitch 450 between the legs 210, 212 of adjacent rows is the same as the seat pitch 452 between the seat pan base 260 and seat back frame 262 of adjacent seat rows. A seat pan base 260 of one or more of the rows may be adjusted. For instance, with reference to FIG. 22, seat pan base 260 and seat back frame 262 of center row is moved in distal direction 454. By moving in distal direction, the seat pitch 452 is increased, whereas the seat pitch 456 is decreased. The seat pitch 450 between the legs 210, 212 of adjacent rows, however, remains fixed.

Figure 23:
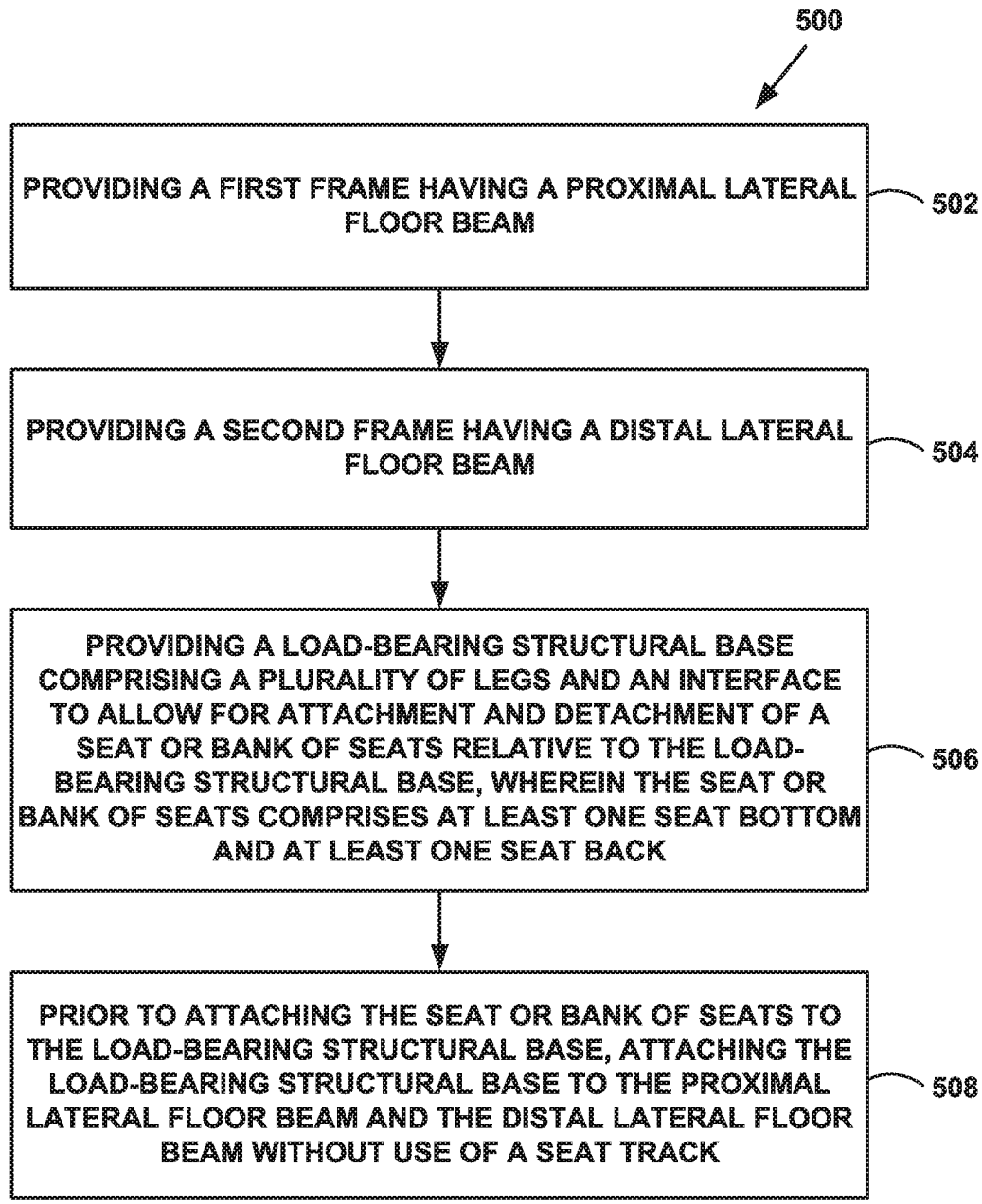
FIG. 23 shows a flowchart of an example method for attaching aircraft seats to a floor of an aircraft, according to an example embodiment.

FIG. 23 shows a flowchart of an example method 500 for attaching a seat or bank of seats to an aircraft. Method 500 shown in FIG. 23 presents an embodiment of a method that, for example, could be carried out by an aircraft manufacturer that is manufacturing the fuselage 200 described with reference to FIGS. 3A-3B, for example. It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 502, the method 500 includes providing a first frame having a proximal lateral floor beam, such as frame 202a having proximal lateral floor beam 204a. At block 504, the method includes providing a second frame having a distal lateral floor beam, such as frame 202b having distal lateral floor beam 204b. At block 506, the method includes providing load-bearing structural base 208 comprising a plurality of legs 210, 212 and an interface 220 to allow for attachment and detachment of a seat or bank of seats 214 relative to the load-bearing structural base 208, where the seat or bank of seats 214 comprises at least one seat bottom 216 and at least one seat back 218. Further, at block 508, the method includes, prior to attaching the seat or bank of seats 214 to the load-bearing structural base 208, attaching the load-bearing structural base 208 to the proximal lateral floor beam 204a and the distal lateral floor beam 204b without use of a seat track.

Figure 24:
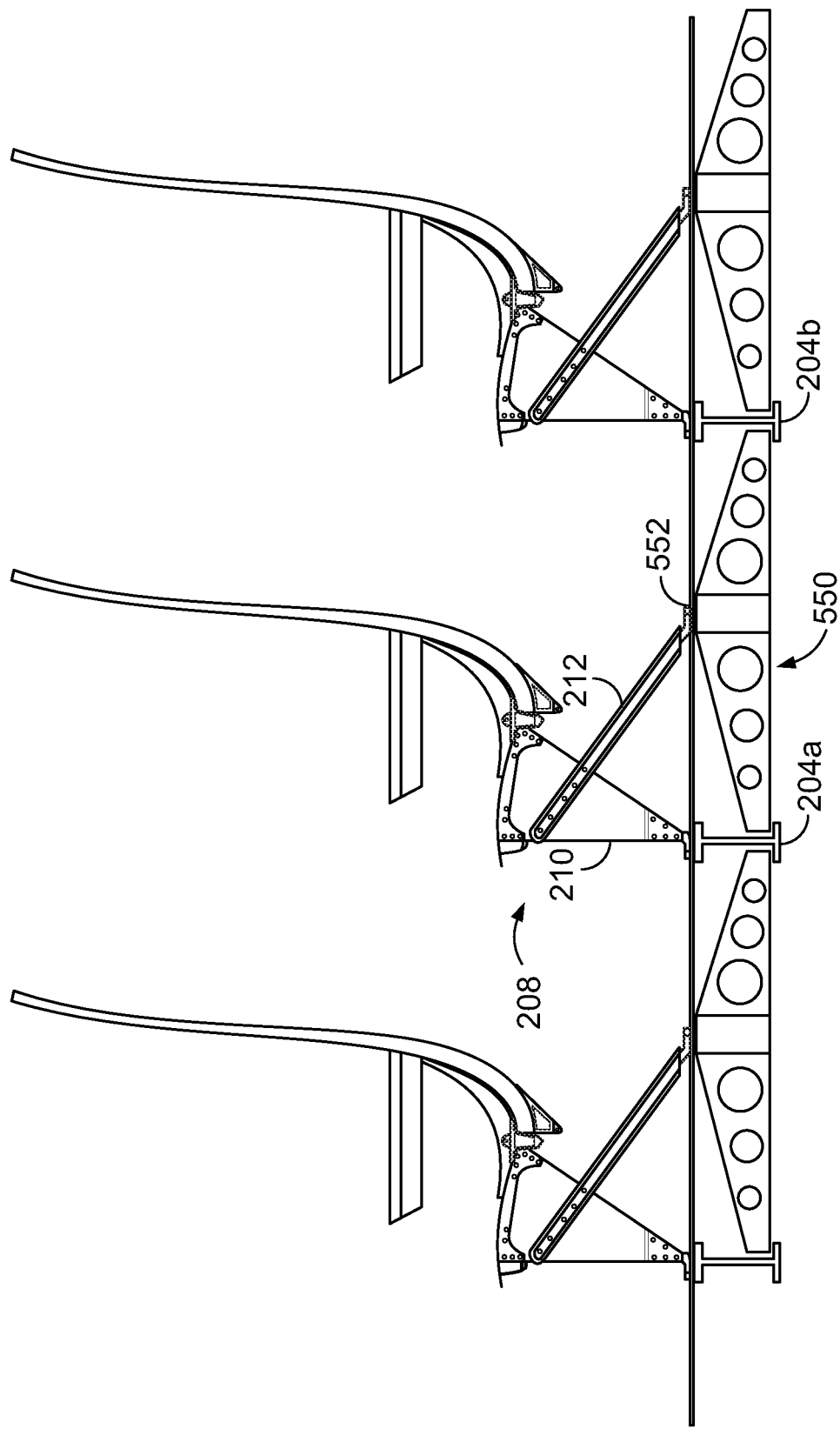
FIG. 24 illustrates a side-sectional view of an example intercostal plate, according to an example embodiment.

FIG. 24 illustrates another example of attaching load-bearing structural base 208 to the lateral floor beams 204a, 204b without attaching to traditional seat tracks. In this example, load-bearing structural base 208 is attached to the lateral floor beams 204a, 204b using a connection fitting. In particular, load-bearing structural base 208 is attached to the lateral floor beams 204a, 204b using an intercostal plate 550 that extends between the lateral floor beams 204a, 204b. The front leg 210 is aligned with the floor beam 204a, and the rear leg 212 is aligned with a top portion 552 of intercostal plate 550. In an example, intercostal plate 550 provides weight savings compared to traditional seats tracks. Further, intercostal plate provides an improved load path to the frame compared to traditional seat tracks.

The intercostal plate 550 may be attached to the load-bearing structural base 208 and floor beams 204a, 204b in any suitable way. In an example, the intercostal plate 550 is attached to leg 212 and floor beams 204a, 204b with fasteners such as nuts and bolts. Other fasteners are possible as well. In another example, intercostal plate 550 is attached directly to the floor beams 204a, 204b. In yet another example, the intercostal plate 550 is attached to brackets attached to the floor beams 204a, 204b. Further, in an example, the front leg 210 is integrally formed with proximal lateral floor beam 204a. In another example embodiment, the front leg 210 is attached to proximal lateral floor beam 204a by other means such as with a fastener. Still further, although in the example of FIG. 24, front leg 210 is aligned with proximal lateral floor beam 204a and rear leg 212 is aligned with the top portion 552 of intercostal plate 550, in another example embodiment, rear leg 212 is aligned with the floor beam and the front leg 210 is aligned with the top portion 552 of intercostal plate 550.

In an example embodiment, in addition to the load-bearing structural base including legs attached to a proximal lateral floor beam and a distal lateral floor beam, the load bearing structural base is also connected to the frame at a side portion of the frame. For instance, in an example, the frame includes a side frame portion, and the load-bearing structural base of the outboard seat(s) includes an inner portion and an outer portion. The inner portion includes legs attached to a proximal lateral floor beam and a distal lateral floor beam, and the outer portion includes a load-bearing connection that connects the load-bearing structural base to the side frame portion. For example, with reference to FIG. 3B, in an example embodiment, the outer portion of the load-bearing structural base of the outboard seats may include a load-bearing connection between the load-bearing structural base and the side frame portion of frame 202a (e.g., rather than legs attached to the floor beams).

Example systems and methods for installing aircraft seats described herein provide numerous advantages over existing systems for installing aircraft seats. For instance, the disclosed methods and systems beneficially reduce or eliminate seat tracks. Since seat tracks typically add substantial weight to the aircraft and are both difficult and expensive to manufacture, reducing or eliminating seat tracks helps to reduce the overall weight of the fuselage and also reduces the overall cost of manufacturing the aircraft.

The disclosed methods and systems also beneficially simplify the design, production, and certification process for aircraft seat suppliers. As mentioned above, in prior methods of installing seats, the airline manufacturer would manufacture the fuselage and seat tracks, while the seat supplier would manufacturer the fittings and the seats attached to the seat tracks. Therefore, the interface to which the seat suppliers would design seats was at the floor water line. In practice, the seat support structure is subject to various certification requirements, such as requirements for reacting to critical conditions (e.g., crash conditions) set forth in FAA 25.562. By moving the interface for attaching the entire seat or bank of seats from the floor water line to the disclosed load-bearing structural base, the design, production, and certification processes for seat suppliers is simplified. In particular, by providing the load-bearing structural base attached to lateral floor beams of the aircraft, the design and production of the seat support structure for reacting to critical load conditions (e.g., crash loads) may now lie with the aircraft manufacturer. As such, the seat suppliers may have lower costs, including lower design costs, lower tooling and fabrication costs, and lower certification costs.

The disclosed systems and methods also simply the aircraft seat installation process and reduce the overall time for manufacturing an aircraft. By allowing for attachment and detachment of the entire bank of seats 214 relative to the load-bearing structural base 208, the load-bearing structural base 208 may be attached to the proximal lateral floor beam 204a and the distal lateral floor beam 204b prior to attaching the bank of seats 214 to the load-bearing structural base 208. This may help to simplify and speed up the aircraft seat installation process. For instance, in an example embodiment, after the load-bearing structural base 208 is attached to the floor beams 204a, 204b, cabling such as in-seat power cabling and in-flight entertainment (IFE) cabling can be routed and connected. Bank of seats 214 may then be attached to the load-bearing structural base 208 after the cabling is complete. This design thus permits the load-bearing structural base 208 to be installed earlier in the aircraft build sequence than the bank of seats 214, which helps to improve work flow, simplifies the cable connection process, and also reduces or minimizes damage to the bank of seats 214 during the aircraft build sequence. Further, during the aircraft manufacturing process, seat supply disruptions and issues may increase the aircraft manufacturing process time. Since the disclosed methods and systems simplifies the design, production, and certification process for aircraft seat suppliers, the disclosed methods and systems may reduce or eliminate seat supply disruptions, which in turn may help to reduce the overall time to manufacture the aircraft.

The disclosed systems and method may also help to simplify the aircraft seat certification process. For instance, attaching the load-bearing structural base to the lateral floor beams without use if a seat track may help to create more efficient load paths for the aircraft seats. This may in turn help to improve the certification process.

The disclosed methods and systems also simply the aircraft seat refurbishing and upgrading process. In particular, allowing for attachment and detachment of the entire bank of seats 214 relative to the load-bearing structural base 208 helps to simply the refurbishing and upgrading process. Since aircraft seats may be detached from the load-bearing structural base 208 while the load-bearing structural base 208 remains fixed to the floor beams 204a, 204b, aircraft seats may be refurbished and upgraded with fewer impacts for re-certification. This helps to reduce both time and costs associated with the re-certification process.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A fuselage comprising:
    a plurality of frames, wherein each frame comprises a lateral floor beam; and a plurality of seat rows spaced apart according to a seat pitch, wherein each seat row of the plurality of seat rows comprises:
    a load-bearing structural base with a plurality of legs attached to a proximal lateral floor beam and a distal lateral floor beam;
    a seat or bank of seats attached to the load-bearing structural base, wherein the seat or bank of seats comprises at least one seat bottom and at least one seat back;
    a seat belt coupled to the load-bearing structural base at a seat belt attachment point for each seat, wherein the seat belt attachment point is vertically aligned with one of the plurality of legs of the load-bearing structural base to thereby transfer a load directly from the seat belt attachment point along the one of the plurality of legs extending from the seat belt attachment point to a fixed point on the one of the plurality of legs: and
    an interface between (i) the load-bearing structural base and (ii) the seat or bank of seats to allow for attachment and detachment of the seat or bank of seats relative to the load-bearing structural base.

2. The fuselage of claim 1, wherein the interface comprises:
    a plurality of fasteners to attach the seat or bank of seats to the load-bearing structural base; and
    a plurality of holes in the load-bearing structural base to receive the plurality of fasteners.

3. The fuselage of claim 1, wherein the plurality of legs are attached to the proximal lateral floor beam and the distal lateral floor beam without attachment to a seat track.

4. The fuselage of claim 3, wherein the load-bearing structural base is attached to the proximal lateral floor beam and the distal lateral floor beam through a plurality of connection fittings, wherein each connection fitting comprises a first portion connected to one of the plurality of legs and a second portion connected to the proximal lateral floor beam or distal lateral floor beam.

5. The fuselage of claim 4, further comprising:
    a floor surface panel, wherein the first portion of the connection fitting is connected to one of the plurality of legs at a level above the floor surface panel, and wherein the second portion of the connection fitting is connected to the proximal lateral floor beam or the distal lateral floor beam at a level below the floor surface panel.

6. The fuselage of claim 4,
    wherein the plurality of legs comprise (i) a front leg attached to the proximal lateral floor beam and (ii) a rear leg attached to the distal lateral floor beam,
    wherein the plurality of seat rows comprise a first seat row and a second seat row,
    wherein the front leg of the load-bearing structural base of the second seat row is attached one of the plurality of connection fittings, and
    wherein the rear leg of the load-bearing structural base of the first row is attached to the same one of the plurality of connection fittings.

7. The fuselage of claim 3, wherein at least one of the plurality of legs is integrally formed with the proximal lateral floor beam or the distal lateral floor beam.

8. The fuselage of claim 3, further comprising:
    at least one longitudinal floor-panel support beam attached to the proximal lateral floor beam and the distal lateral floor beam, wherein the at least one longitudinal floor-panel support beam is positioned below a floor surface panel; and
    a transverse anchor beam attached to the at least one longitudinal floor-panel support beam, wherein the plurality of legs comprise a front leg and a rear leg, wherein the front leg is attached to one of the at least one longitudinal floor-panel support beam, and wherein the rear leg is attached to the transverse anchor beam.

9. The fuselage of claim 8, further comprising a plate attached to the distal lateral floor beam and one of the at least one longitudinal floor-panel support beam, wherein the front leg is aligned with the proximal lateral floor beam, and wherein the rear leg is aligned with the transverse anchor beam.

10. The fuselage of claim 3, further comprising:
    a floor surface panel; and
    at least one longitudinal floor-panel support beam positioned below the floor surface panel, wherein each leg of the plurality of legs is attached to the at least one longitudinal floor-panel support beam, and wherein each longitudinal floor-panel support beam of the at least one longitudinal floor-panel support beam is attached to the proximal lateral floor beam and the distal lateral floor beam.

11. The fuselage of claim 10, wherein the plurality of seat rows comprises a first seat row and a second seat row,
    wherein the load-bearing structural base of the first seat row is attached to a first longitudinal floor-panel support beam of the at least one longitudinal floor-panel support beam, wherein the load-bearing structural base of the second seat row is attached to a second longitudinal floor-panel support beam of the at least one longitudinal floor-panel support beam, and wherein a distal end of the first longitudinal floor-panel support beam is nested with a proximal end of the second longitudinal floor-panel support beam.

12. The fuselage of claim 11, wherein a shape of the distal end of the longitudinal floor-panel support beam and a shape of the proximal end of the longitudinal floor-panel support beam are selected such that the first longitudinal floor-panel support beam and the second longitudinal floor-panel support beam are moveable relative to one another so as to allow for adjusting the seat pitch.

13. The fuselage of claim 1, wherein the plurality of frames are spaced apart according to a frame pitch, and wherein the frame pitch is substantially the same as the seat pitch.

14. The fuselage of claim 1, wherein the load-bearing structural base further comprises a seat pan base to support the at least one seat bottom.

15. The fuselage of claim 14, wherein the seat pan base is moveable relative to the plurality of legs.

16. The fuselage of claim 14, wherein the load-bearing structural base further comprises a seat back frame to support the at least one seat back.

17. The fuselage of claim 16, wherein the at least one seat bottom comprises at least one seat bottom cushion, wherein the at least one seat back comprises at least one seat back cushion, and wherein the interface comprises at least one fastener to attach and detach the at least one seat bottom cushion to the seat pan base and the at least one seat back cushion to the seat back frame, wherein the at least one fastener comprises one or more fasteners selected from the group consisting of a screw, a nut and bolt, a button, a hook, a hook-and-loop fastener, and a zipper.

18. A fuselage comprising:
a first frame comprising a proximal lateral floor beam;
a second frame comprising a distal lateral floor beam, wherein the first frame and the second frame are spaced apart according to a frame pitch; and
a seat row comprising:
a load-bearing structural base with a plurality of legs attached to the proximal lateral floor beam and the distal lateral floor beam through a plurality of connection fittings, wherein each connection fitting comprises a first portion connected to one of the plurality of legs and a second portion connected to the proximal lateral floor beam or the distal lateral floor beam, and wherein at least one of the plurality of legs is aligned with the proximal lateral floor beam or the distal lateral floor beam;

a seat or bank of seats attached to the load-bearing structural base, wherein the seat or bank of seats comprises at least one seat bottom and at least one seat back;

a seat belt coupled to the load-bearing structural base at a seat belt attachment point for each seat, wherein the seat belt attachment point is vertically aligned with one of the plurality of legs of the load-bearing structural base to thereby transfer a load directly from the seat belt attachment point along the one of the plurality of legs extending from the seat belt attachment point to a fixed point on the one of the plurality of legs: and an interface between (i) the load-bearing structural base and (ii) the seat or bank of seats to allow for attachment and detachment of the seat or bank of seats relative to the load-bearing structural base.

19. A method of attaching a seat or bank of seats to an aircraft, the method comprising:
providing a first frame having a proximal lateral floor beam;
providing a second frame having a distal lateral floor beam;
providing a load-bearing structural base comprising a plurality of legs and an interface to allow for attachment and detachment of a seat or bank of seats relative to the load-bearing structural base, wherein the seat or bank of seats comprises at least one seat bottom and at least one seat back;
providing a seat belt coupled to the load-bearing structural base at a seat belt attachment point for each seat, wherein the seat belt attachment point is vertically aligned with one of the plurality of legs of the load-bearing structural base to thereby transfer a load directly from the seat belt attachment point along the one of the plurality of legs extending from the seat belt attachment point to a fixed point on the one of the plurality of legs: and
prior to attaching the seat or bank of seats to the load-bearing structural base, attaching the load-bearing structural base to the proximal lateral floor beam and the distal lateral floor beam without use of a seat track.

20. The fuselage of claim 1, wherein the seat belt is coupled to the load-bearing structural base at a shoulder belt attachment point for each seat.

* * * * *